US009183598B2

(12) United States Patent
Dey et al.

(10) Patent No.: US 9,183,598 B2
(45) Date of Patent: Nov. 10, 2015

(54) IDENTIFYING EVENT-SPECIFIC SOCIAL DISCUSSION THREADS

(71) Applicant: International Business Machines Corporation, Armonk, NY (US)

(72) Inventors: Kuntal Dey, West Bengal (IN); Seema Nagar, New Delhi (IN); Kanika Narang, New Delhi (IN); Sameep Mehta, New Delhi (IN); L. Venkata Subramaniam, New Delhi (IN); Mukesh K. Mohania, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 338 days.

(21) Appl. No.: 13/904,503

(22) Filed: May 29, 2013

(65) Prior Publication Data

US 2014/0358912 A1  Dec. 4, 2014

(51) Int. Cl.
*G06F 7/00* (2006.01)
*G06Q 50/00* (2012.01)
*G06F 17/30* (2006.01)

(52) U.S. Cl.
CPC ............ *G06Q 50/01* (2013.01); *G06F 17/3087* (2013.01)

(58) Field of Classification Search
CPC .................................................. G06F 17/3087
See application file for complete search history.

(56) References Cited

U.S. PATENT DOCUMENTS

| 8,204,988 B2 | 6/2012 | Lin et al. |
| 8,375,024 B2 | 2/2013 | Goeldi |
| 2010/0119053 A1 | 5/2010 | Goeldi |
| 2010/0312769 A1 | 12/2010 | Bailey et al. |
| 2013/0151522 A1* | 6/2013 | Aggarwal et al. ............. 707/737 |

OTHER PUBLICATIONS

Narang et al. Discovery and Analysis of Evolving Topical Social Discussions on Unstructured Micro-blogs, Advances in Information Retrieval Lecture Notes in Computer Science vol. 7814, 2013, pp. 545-556.
Fujisaka et al. Monitoring Geo-Social Activities Through Micro-Blogging Sites, 2010.
Yin et al. Exploring Link, Text and Spatial-Temporal Data in Social Media, University of Illinois at Urbana-Champaign, 2012.
Abrol et al. TWinner: Understanding News Queries with Geo-Content Using Twitter. GIR'10, Feb. 18-19, 2010.
Magnami et al. Conversation Retrieval for Microblogging sites, Inf. Retrieval (2012) 15:354-372.

* cited by examiner

*Primary Examiner* — Ajith Jacob
(74) *Attorney, Agent, or Firm* — Ryan, Mason & Lewis, LLP

(57) ABSTRACT

Techniques, systems, and articles of manufacture for identifying event-specific social discussion threads. A method includes identifying a spatial relationship and one or more additional relationships across two or more topical clusters derived from a text source, extracting one or more temporally evolving discussion sequences across the two or more topical clusters, identifying at least one social discussion thread across the two or more topical clusters by identifying a correlation between the one or more additional relationships and the one or more temporally evolving discussion sequences, and to identifying a geographically-constrained social discussion thread among the at least one identified social discussion thread by identifying a correlation between the spatial relationship across the two or more topical clusters and the at least one identified social discussion thread.

20 Claims, 3 Drawing Sheets

IDENTIFYING EVENT-SPECIFIC SOCIAL DISCUSSION THREADS

FIELD OF THE INVENTION

Embodiments of the invention generally relate to information technology, and, more particularly, to social networking analysis.

BACKGROUND

Discussions are detected in online settings using existing approaches wherein discussions are explicitly captured (such as on discussion threads of online forums, blogs, comments sections, etc.). However, in settings wherein discussion threads are not explicit (such as in micro-blogs), such existing approaches cannot identify or extract or identify social discussions, nor can such existing approaches identify geographically-constrained social discussion threads. Accordingly, a need exists for processing micro-blog posts beyond natural language topic similarity measures.

SUMMARY

In one aspect of the present invention, techniques for identifying event-specific social discussion threads are provided. An exemplary computer-implemented method can include steps of identifying a spatial relationship and one or more additional relationships across two or more topical clusters derived from a text source, extracting one or more temporally evolving discussion sequences across the two or more topical clusters, and identifying at least one social discussion thread across the two or more topical clusters by identifying at least one correlation between the one or more additional relationships and the one or more temporally evolving discussion sequences. The method also includes identifying a geographically-constrained social discussion thread among the at least one identified social discussion thread by identifying at least one correlation between the spatial relationship across the two or more topical clusters and the at least one identified social discussion thread.

In another aspect of the invention, a method can include the steps of identifying a spatial relationship, a temporal relationship and a social relationship across two or more topical clusters derived from an Internet text source, extracting one or more temporally evolving discussion sequences across the two or more topical clusters, and identifying at least one social discussion thread across the two or more topical clusters by identifying a correlation between the temporal relationship and the one or more temporally evolving discussion sequences and a correlation between the social relationship and the one or more temporally evolving discussion sequences. The method also includes identifying a geographically-constrained social discussion thread among the at least one identified social discussion thread by identifying a correlation between the spatial relationship across the two or more topical clusters and the at least one identified social discussion thread.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
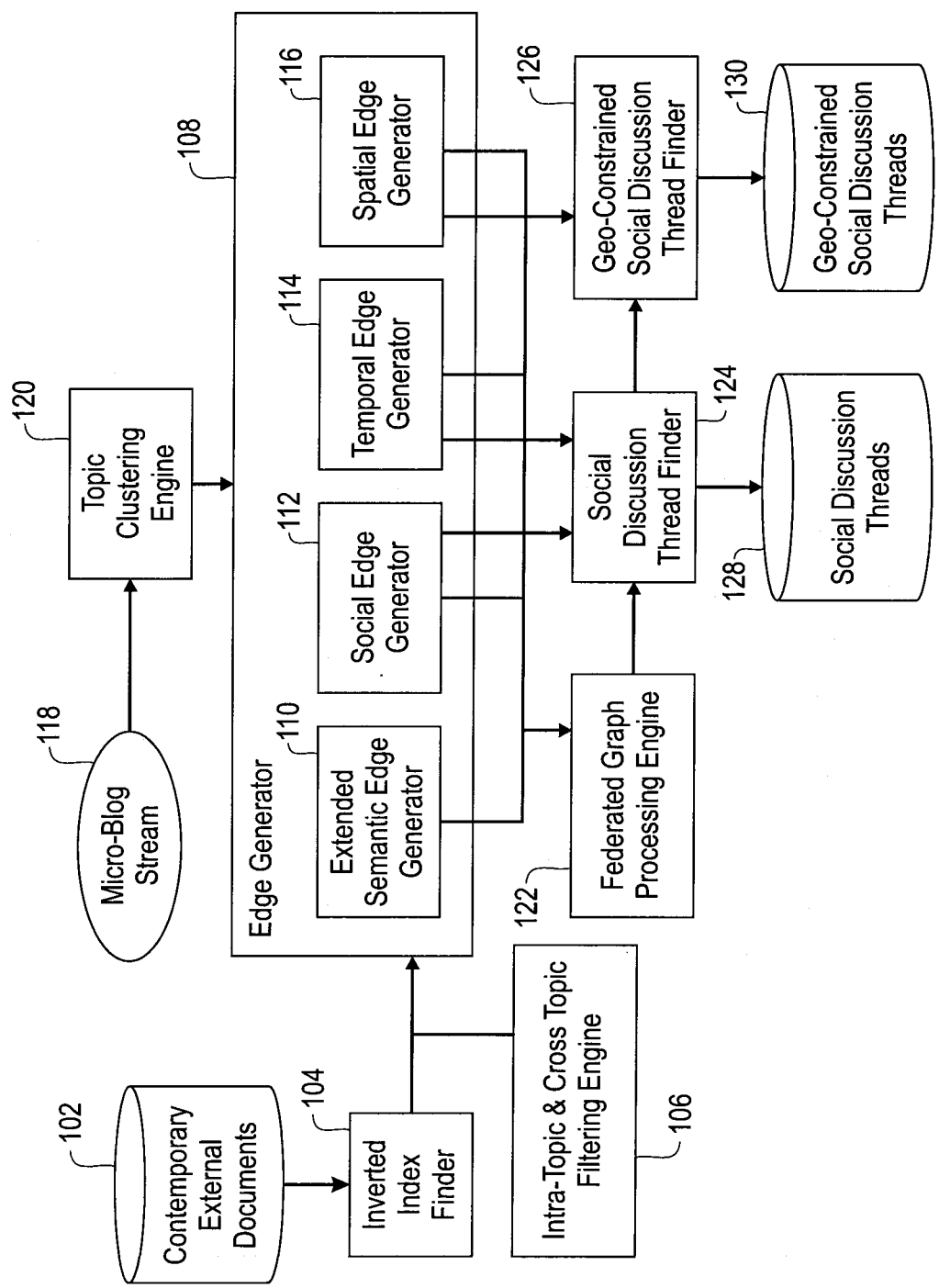
FIG. 1 is a block diagram illustrating an example embodiment, according to an aspect of the invention.

As described herein, an aspect of the present invention includes techniques for identifying geographically-constrained (geo-constrained) social discussion threads from micro-blogs. As used herein, a micro-blog refers to a writing platform analogous to a blog writing platform (Twitter serving as one example). In a micro-blog, a user can generate and receive micro-blog entries, become explicit followers of other users, forward micro-blog entries made by other users and mention other users. The content of micro-blogs is typically short or brief collections of text. Additionally, micro-blogs, unlike online discussion forums, are devoid of any explicit or well-defined discussion thread.

At least one embodiment of the invention includes extracting social discussion threads from micro-blogs and identifying geo-constrained social discussion threads based on or more parameters including a social relationship, a temporal relationship, a spatial relationship, a semantic relationship, and/or a topic-conditioned extended semantic relationship (for example, damage and relief are related within the context of an earthquake, but such a relationship may not be captured by existing approaches).

In accordance with at least one embodiment of the invention, input can include, for example, a list of topic clusters extracted from a micro-blog stream. Each topic cluster can be represented by K keywords, wherein the keywords are extracted based on existing text extraction techniques (such as term frequency-inverse document frequency (tf-idf), etc.). Additional input can include a temporal interval during which a corresponding topic cluster was active, wherein such an interval can be generated by taking the time of the first post and the last post in the topic cluster.

Input can also include a spatial interval based, for example, on location tagging in micro-blogs, geo-tagged messages, sensor-driven inputs (in the case of sensor-supplemented device usage), and any external data source identifying geographical origin of the micro-blog and geographical origin of the individual posting the micro-blog entry. Further, example input can additionally include a user list (for example, a list of usernames or handles of users who contributed to the topic cluster).

At least one embodiment of the invention also includes establishing social relationships within extracted topic clusters. For example, at least one embodiment of the invention includes constructing a social graph between a pair of topic clusters using social connections of users contributing to the topic clusters. Various metrics can be used to compute the social proximity. Such metrics can include, for example, common users, common first hop neighbors, community memberships, and/or any other explicit or implicit social relationships derived from a data source.

Additionally, at least one embodiment of the invention includes establishing temporal relationships within extracted topic clusters. For example, at least one embodiment of the invention includes assigning temporal relationships between two topic clusters (for example, via Allen's interval algebra). Every cluster includes a starting time and an ending time associated therewith. For example, the micro-blog post appearing earliest in time marks the starting time of the cluster, and the micro-blog post appearing latest in time marks the ending time of the cluster. By way of illustration, consider the following example temporal relationships:

Topic cluster A ends before topic cluster B starts;
Topic cluster A overlaps with topic cluster B, wherein the starting time of cluster A is between the starting and ending time of cluster B, and the ending time of cluster B is after the ending time of cluster A, or vice versa;
Topic cluster A and topic cluster B are disjointed, wherein the starting time of one cluster is after the ending time of the other cluster; and
Topic cluster A is contained in topic cluster B's time-line, wherein the starting time of cluster A is after the starting time of cluster B, and the ending time of cluster A is before the ending time of cluster B.

At least one embodiment of the invention also includes establishing spatial relationships within extracted topic clusters. For example, at least one embodiment of the invention includes assigning spatial relationships between two or more topic clusters, including, for example, the following spatial relationships:

Cluster A is contained in cluster B;
Cluster A touches cluster B; and
Clusters A and B are disjointed.

Every cluster includes a set of locations associated therewith, and at least one embodiment of the invention includes creating a geo-spatial edge between clusters, for example, between cluster A and cluster B, when one of the above relationships is satisfied for at least one pair of locations (that is, for one location of cluster A and one location of cluster B). Additionally, a weight can be associated with the edge depending upon, for example, the number of location pairs satisfied across the cluster pair, cluster diameter, etc.

As detailed herein, an aspect of the invention includes extending semantic relationships across clusters. By way of example, an external document corpus can be utilized to assign such relationships. For instance, news and/or event-related websites can be used to generate such a corpus. In at least one embodiment of the invention, clusters are extracted from micro-blog entries, and an external document corpus is used to establish semantic patterns.

Accordingly, at least one embodiment of the invention includes generating a pair of candidate concepts based on a cross-product of keywords derived from two or more topic clusters. The concept pairs can be linked semantically using one or more lexical database analysis tools and/or tf-idf measures. Additionally, the concept pairs, in at least one embodiment of the invention, can be pruned.

Further, correlation scores are computed for each pair of topic clusters. For each concept pair belonging to the clusters (for example, one concept from each cluster), at least one embodiment of the invention includes computing the number of times the pair co-occurs in the document corpus, as well as the lexical similarity of the pair as computed per one or more lexical database analysis tools. If the count (or the sum, in another embodiment of the invention, or a combination of the count and the sum, in yet another embodiment of the invention) of correlation scores is more than a desired and/or pre-determined threshold, an extended semantic relationship is established.

As also described herein, at least one embodiment of the invention includes identifying temporally evolving discussion sequences across clusters. Temporal relationships and/or extended semantic relationships, such as detailed herein, can be used to identify evolving discussion sequences across topical clusters. For example, one or a combination of multiple logical operators (for instance, the AND operator) on temporal relationships and extended semantic relationships can be applied, and a correlation score is derived for each pair of clusters in the discussion sequences based upon the associated scores in corresponding extended semantic relationships. By way of example, the strength of co-occurrence of words used in defining topics in the external document corpus can be used to derive the strength of the extended semantic correlation edges. Also, for instance, the correlation scores for each pair of clusters can be assigned to be a linear function or a direct mapping of the extended semantic relationship scores. Additionally, in at least one embodiment of the invention, the discussion sequences can be pruned where correlation scores are below a user-specified and/or pre-determined threshold.

At least one embodiment of the invention includes identifying social discussion threads, for example, via use of temporally evolving discussion sequences and social relationships. By way of illustration, a social discussion thread can be represented as a directed acyclic graph (DAG), or any derivative expression of a DAG. Accordingly, a combination of multiple logical operators can be applied on the social relationships, and correlation scores for each pair of clusters (or edges) in the social discussion thread can be computed by combining a correlation score on a discussion sequence with the score in the corresponding social relationship. Such a combination can, for example, be multiplicative or additive, among other options of combination. Also, the strength of each social discussion thread can be computed by combining the scores of each edge involved in the social discussion thread graph.

By way of illustration, consider the following example. Assume that there are three topic clusters: A, B and C. Also, assume that users $a_1, a_2, \ldots a_n$ belong to cluster A, users $b_1, b_2, \ldots b_n$ belong to cluster B, and users $c_1, c_2, \ldots c_n$ belong to cluster C. Also, assume that there are topics $ta_1$ and $tb_1$ that have an extended semantic edge of weight computed as topic-similarity $(ta_1, tb_1) = wta_1tb_1$. Accordingly, the topic-similarity function is derived in the form of co-occurrence in the external corpus of the words and/or concepts defining topics $ta_1$ and $tb_1$. Additionally, it is noted that $a_1, a_3, b_2$ and $b_4$ are the users associated with these topics; also, $a_1$ and $b_2$ are social neighbors, $a_1$ and $b_4$ are social neighbors and $a_2$ and $b_3$ are social neighbors.

Further, for simplicity, assume that all of the extended semantic relationships and social relationships satisfy the temporal edge construction factors. As such, the strength of social discussion threads can be manifested, in accordance with at least one embodiment of the invention, with a multiplication operator to combine the extended semantic edges with the social edges, and also via use of an addition operation to combine the social weights, such as follows: $wta_1tb_1 * (w$ ($a_1,b_2$)+w($a_1,b_4$)+w($a_2,b_3$)). Such an example embodiment can be carried out by taking the temporal relationship strength=1 for all of the relevant times. If the strength of the temporal relationship is taken as non-unity, at least one embodiment of the invention can include operating (via multiplication, for example) the above expression with the function that defines the temporal relationship strength.

Additionally, at least one embodiment of the invention includes identifying geo-constrained social discussion threads. Spatial edges are retained across clusters correlated with social discussion threads, and remaining (uncorrelated) edges are eliminated, leading to a geo-filtered social discussion graph. Correlation can be established by carrying out logical and/or other operations on the geo-spatial graph and the social discussion thread graph. For example, the logical operator can be a logical AND operator, retaining directions in the social discussion threads and respecting any direction present in the geo-spatial graph.

Further, at least one embodiment of the invention includes applying geographical constraints to the geo-filtered social discussion graph, as per input requirement specifications, to produce a final output including a set of geo-constrained social discussion threads. In an example embodiment of the invention, the input specifications may require the locations associated on a graph to be within a set of one or more defined geographical boundaries. In another embodiment of the invention, the input specifications may require a maximum, a minimum, an average, or any other defined geodesic distance measure, for some or all of the associated locations.

FIG. 1 is a block diagram illustrating an example embodiment, according to an aspect of the invention. By way of illustration, FIG. 1 depicts a contemporary external document database 102, which provides input to an inverted index finder component 104, which along with an intra-topic and cross topic filtering engine 106, provide input to an edge generator component 108. Additionally, a micro-blog stream 118 provides input to a topic clustering engine 120, which in turn, provides input to edge generator component 108 as well.

The edge generator component 108 includes an extended semantic edge generator component 110, a social edge generator component 112, a temporal edge generator component 114 and a spatial edge generator component 116, which provide input to federated graph processing engine 122. Additionally, as depicted in FIG. 1, the social edge generator component 112 and the temporal edge generator component 114 provide input to social discussion thread finder component 124, and the spatial edge generator component 116 provides input to geo-constrained social discussion thread finder component 126.

Further, the social discussion thread finder component 124 provides input to a social discussion thread database 128, and the geo-constrained social discussion thread finder component 126 provides input to a geo-constrained social discussion thread database 130.

The contemporary external document database 102 includes a set of relevant contemporary external documents, determined and/or identified by searching external documents. In at least one embodiment of the invention, such a search of external documents can be limited via an appropriate or chosen time frame. The inverted index finder component 104 and cross topic filtering engine 106 run term frequency and inverted document frequency (tf-idf) algorithms, as well as identify related concepts using concept matching tools. The micro-blog stream 118 includes the micro-blog stream to be analyzed. As noted herein, an example micro-blog stream can include, for instance, Twitter. Additionally, the topic clustering engine 120 is used to create topic clusters from the micro-blog stream 118.

The extended semantic edge generator component 110, social edge generator component 112, temporal edge generator component 114 and spatial edge generator component 116 are components used to generate different kinds of edges. Specifically, the extended semantic edge generator component 110 uses an external corpus of documents, the social edge generator component 112 uses friendship and/or follower relationships from the micro-blog, the temporal edge generator component 114 examines the time-stamps of the micro-blog entries (such as the time of a tweet, in the case of the Twitter example), and the spatial edge generator component 116 examines the geo-location of the origin of the micro-blog (and/or micro-blog entry) and the profile location of the originator and/or author of the micro-blog (and/or micro-blog entry).

The federated graph processing engine 122 is used to combine base graphs to form discussion sequences, as well as to derive temporal and geographical relationships. Also, the social discussion thread finder component 124 is used to apply the method of forming social discussion threads using the outputs of social edge generator component 112, temporal edge generator component 114 and federated graph processing engine 122. Further, social discussion thread database 128 is used to store the social discussion threads determined by social discussion thread finder component 124. Also, the geo-constrained social discussion thread finder component 126 uses the output of the spatial edge generator component 116 and the social discussion thread finder component 124 to determine geo-constrained discussion threads, which are then stored in the geo-constrained social discussion thread database 130.

Figure 2:
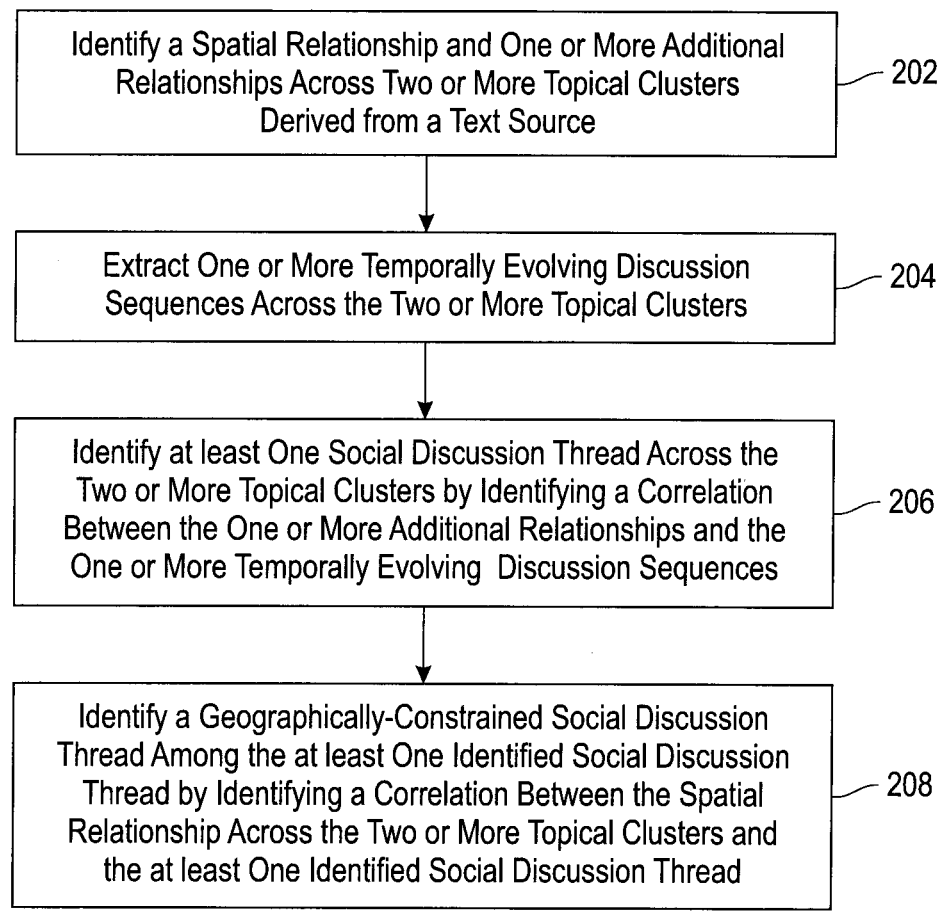
FIG. 2 is a flow diagram illustrating techniques according to an embodiment of the invention.

FIG. 2 is a flow diagram illustrating techniques according to an embodiment of the present invention. Step 202 includes identifying a spatial relationship and one or more additional relationships across two or more topical clusters derived from a text source (for example, a micro-blog entry). The one or more relationships include social relationships, semantic relationships, temporal relationships and/or spatial relationships. Additionally, identifying one or more relationships can include using an external document corpus to determine the relationships. As detailed herein, the external document corpus can be based on multiple event-related websites.

Also, each of the two or more topical clusters derived from a text source includes a portion of text comprising one or more keywords. Further, each topical cluster can additionally include a temporal interval for which the topical cluster was active and/or a spatial interval associating geographic data to the topical cluster.

Step 204 includes extracting one or more temporally evolving discussion sequences across the two or more topical clusters. Extracting temporally evolving discussion sequences can include identifying a semantic relationship and a temporal relationship between two or more portions of the two or more topical clusters.

Step 206 includes identifying at least one social discussion thread across the two or more topical clusters by identifying a correlation between the one or more additional relationships and the one or more temporally evolving discussion sequences. Identifying a correlation between the identified relationships and the temporally evolving discussion sequences can include computing a correlation score for each correlation between the identified relationships and the temporally evolving discussion sequences. Further, identifying a social discussion thread can include identifying a correlation between the identified relationships and the temporally evolving discussion sequences with a correlation score above a pre-determined threshold.

Step 208 includes identifying a geographically-constrained social discussion thread among the at least one identified social discussion thread by identifying a correlation between the spatial relationship across the two or more topical clusters and the at least one identified social discussion thread. Additionally, as detailed herein, the spatial relationship can include an association between the two or more topical clusters within a set of one or more geographical boundaries. Also, the spatial relationship can include an association between the two or more topical clusters of a defined distance measure.

Additionally, at least one embodiment of the invention includes identifying a spatial relationship, a temporal relationship and a social relationship across two or more topical clusters derived from an Internet text source, extracting one or more temporally evolving discussion sequences across the two or more topical clusters, and identifying at least one social discussion thread across the two or more topical clusters by identifying a correlation between the temporal relationship and the one or more temporally evolving discussion sequences and a correlation between the social relationship and the one or more temporally evolving discussion sequences. Such an embodiment of the invention also includes identifying a geographically-constrained social discussion thread among the at least one identified social discussion thread by identifying a correlation between the spatial relationship across the two or more topical clusters and the at least one identified social discussion thread.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 3:
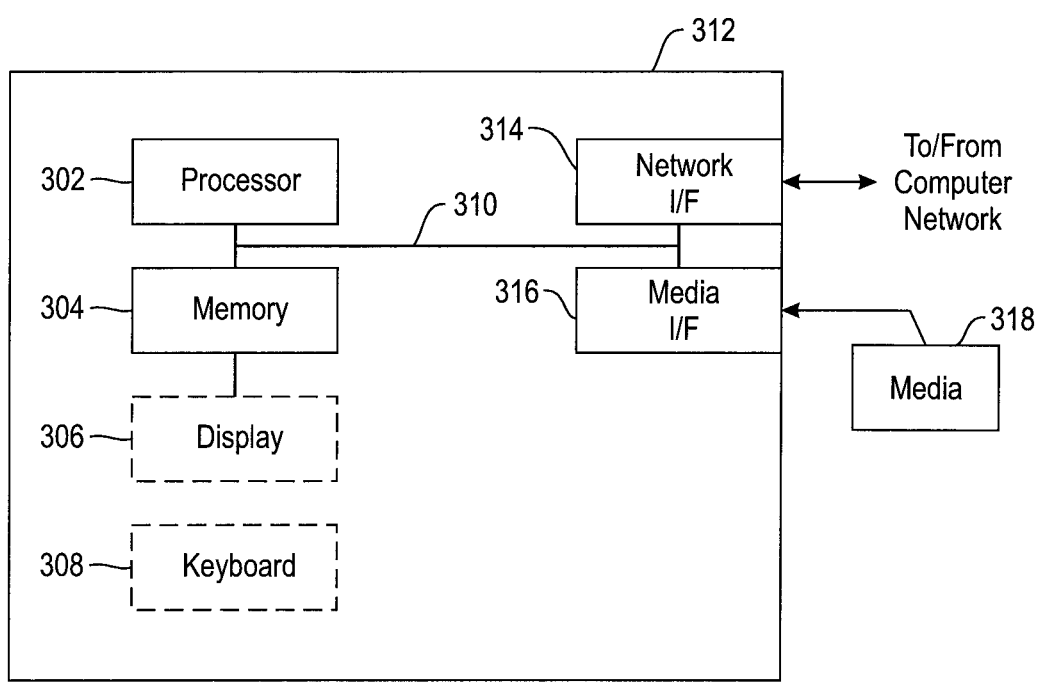
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Additionally, a data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) fuming a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the to singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, identifying geo-constrained social discussion threads based on a variety of relationships.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying a spatial relationship and one or more additional relationships across two or more topical clusters derived from a text source;
   extracting one or more temporally evolving discussion sequences across the two or more topical clusters;
   identifying at least one social discussion thread across the two or more topical clusters by identifying at least one correlation between (i) the one or more additional relationships and (ii) the one or more temporally evolving discussion sequences; and
   identifying a geographically-constrained social discussion thread among the at least one identified social discussion thread by identifying at least one correlation between (i) the spatial relationship across the two or more topical clusters and (ii) the at least one identified social discussion thread;
   wherein at least one of the steps is carried out by a computer device.

2. The method of claim 1, wherein said text source comprises a micro-blog entry.

3. The method of claim 1, wherein said spatial relationship comprises an association between the two or more topical clusters within a set of one or more geographical boundaries.

4. The method of claim 1, wherein said spatial relationship comprises an association between the two or more topical clusters of a defined distance measure.

5. The method of claim 1, wherein said one or more additional relationships comprises one or more social relationships.

6. The method of claim 1, wherein said one or more additional relationships comprises one or more semantic relationships.

7. The method of claim 1, wherein said one or more additional relationships comprises one or more temporal relationships.

8. The method of claim 1, wherein said identifying one or more additional relationships comprises using an external document corpus to determine the one or more additional relationships.

9. The method of claim 8, wherein the external document corpus is based on multiple event-related websites.

10. The method of claim 1, wherein each of the two or more topical clusters derived from a text source comprises a portion of text comprising one or more keywords.

11. The method of claim 1, wherein each of the two or more topical clusters derived from a text source comprises a temporal interval for which the topical cluster was active.

12. The method of claim 1, wherein each of the two or more topical clusters derived from a text source comprises a spatial interval associating geographic data to the topical cluster.

13. The method of claim 1, wherein said extracting one or more temporally evolving discussion sequences comprises identifying a semantic relationship and a temporal relationship between two or more portions of the two or more topical clusters.

14. The method of claim 1, wherein said identifying at least one correlation between (i) the one or more additional identified relationships and (ii) the one or more temporally evolving discussion sequences comprises computing a correlation score for each of the at least one correlation between (i) the one or more additional identified relationships and (ii) the one or more temporally evolving discussion sequences.

15. The method of claim 14, comprising:
   identifying a social discussion thread across the two or more topical clusters by identifying at least one correlation between (i) the one or more additional identified relationships and (ii) the one or more temporally evolving discussion sequences with a correlation score above a pre-determined threshold.

16. An article of manufacture comprising a computer readable storage medium having computer readable instructions tangibly embodied thereon which, when implemented, cause a computer to carry out a plurality of method steps comprising:
   identifying a spatial relationship and one or more additional relationships across two or more topical clusters derived from a text source;
   extracting one or more temporally evolving discussion sequences across the two or more topical clusters;
   identifying at least one social discussion thread across the two or more topical clusters by identifying at least one correlation between (i) the one or more additional relationships and (ii) the one or more temporally evolving discussion sequences; and
   identifying a geographically-constrained social discussion thread among the at least one identified social discussion thread by identifying at least one correlation between (i) the spatial relationship across the two or more topical clusters and (ii) the at least one identified social discussion thread.

17. The article of manufacture of claim 16, wherein said one or more additional relationships comprises one or more social relationships.

18. The article of manufacture of claim 16, wherein said one or more additional relationships comprises one or more temporal relationships.

19. A system comprising:
a memory; and
at least one processor coupled to the memory and configured for:
identifying a spatial relationship and one or more additional relationships across two or more topical clusters derived from a text source;
extracting one or more temporally evolving discussion sequences across the two or more topical clusters;
identifying at least one social discussion thread across the two or more topical clusters by identifying at least one correlation between (i) the one or more additional relationships and (ii) the one or more temporally evolving discussion sequences; and
identifying a geographically-constrained social discussion thread among the at least one identified social discussion thread by identifying at least one correlation between (i) the spatial relationship across the two or more topical clusters and (ii) the at least one identified social discussion thread.

20. A method comprising:
identifying a spatial relationship, a temporal relationship and a social relationship across two or more topical clusters derived from an Internet text source;
extracting one or more temporally evolving discussion sequences across the two or more topical clusters;
identifying at least one social discussion thread across the two or more topical clusters by identifying at least one correlation between the temporal relationship and the one or more temporally evolving discussion sequences and identifying at least one correlation between the social relationship and the one or more temporally evolving discussion sequences; and
identifying a geographically-constrained social discussion thread among the at least one identified social discussion thread by identifying at least one correlation between the spatial relationship across the two or more topical clusters and the at least one identified social discussion thread;
wherein at least one of the steps is carried out by a computer device.

* * * * *